Aug. 24, 1954  E. C. KOERPER  2,686,957
METHOD OF MANUFACTURING HEAT EXCHANGER SECTIONS
Filed Aug. 17, 1951
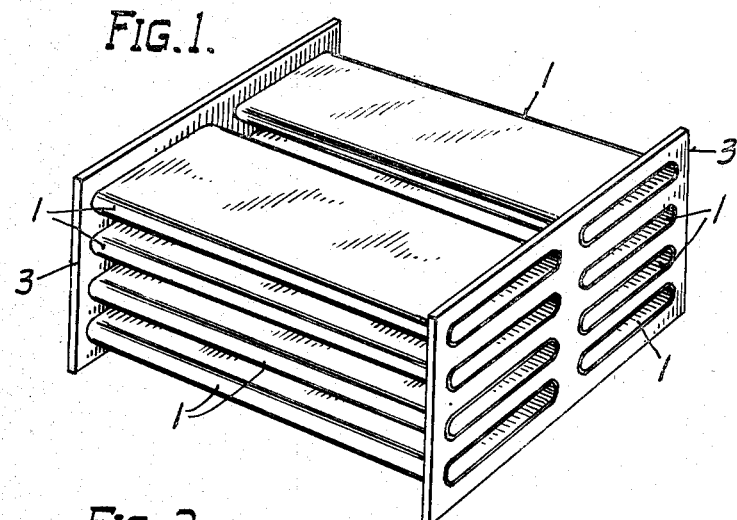
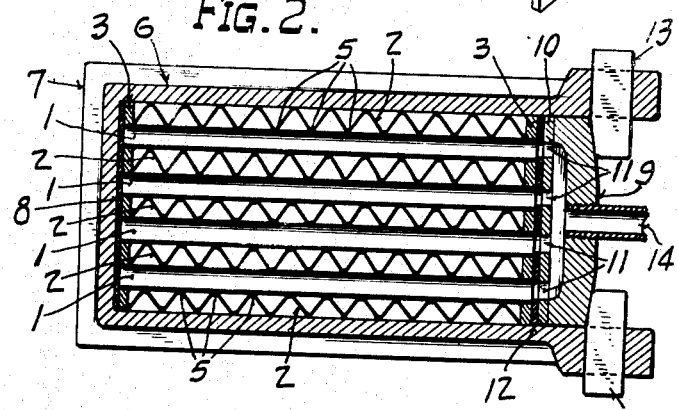
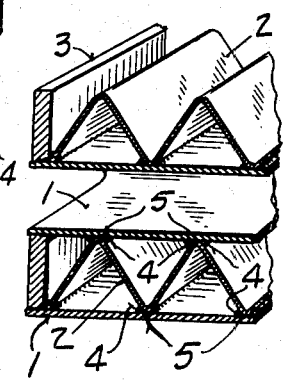
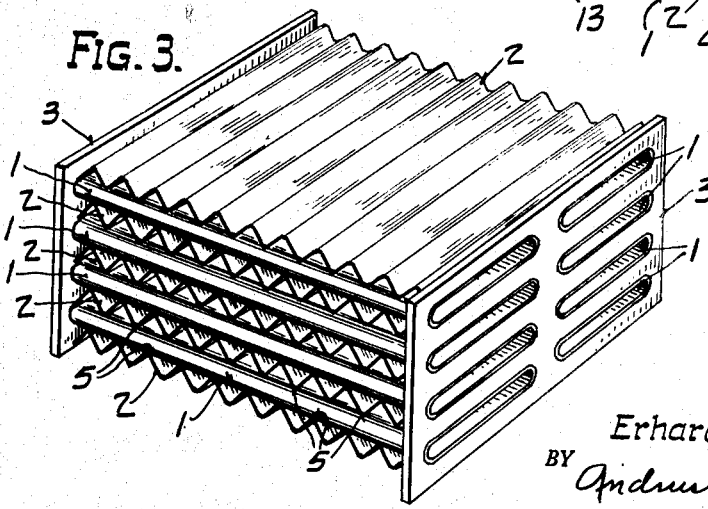
INVENTOR.
Erhardt C. Koerper
BY
ATTORNEYS.

Patented Aug. 24, 1954

2,686,957

UNITED STATES PATENT OFFICE 2,686,957

METHOD OF MANUFACTURING HEAT EXCHANGER SECTIONS

Erhardt C. Koerper, Milwaukee, Wis., assignor to A. O. Smith Corporation, Milwaukee, Wis., a corporation of New York Application August 17, 1951, Serial No. 242,280

1 Claim. (Cl. 29—157.3)

This invention relates to a method of manufacturing heat exchanger sections, and particularly to the assembly and soldering of stacked heat exchanger elements having fluid tight chambers therein.

An object of the invention is to provide a method of holding heat exchanger elements in tightly abutting relationship during the soldering thereof, thereby improving the bond between the elements for increased heat transfer therebetween and greater strength of the finished product.

A further object is to provide a method of manufacturing heat exchanger sections having precise predetermined dimensions to make possible the accurate assembly of corresponding sections into a completed heat exchanger.

The method, in general, comprises confining a number of assembled heat exchanger elements within a confining member which is internally dimensioned in accordance with the desired size of the section. Thereafter, fluid pressure is applied within those elements which define fluid tight chambers to thus expand the size of said chambers and force the confined elements outwardly against the confining member. The elements are then bonded together in such a manner that the chambers remain in expanded condition, so that the size of the resulting section conforms exactly to the internal dimensions of the confining member.

Other objects and advantages of the invention will be set forth more fully in the following description of the embodiment of the invention illustrated in the accompanying drawing.

In the drawing:

Figure 1 is a perspective view of the tubes and tube sheets of a heat exchanger section being manufactured in accordance with the method of the invention;

Fig. 2 is a cross sectional view showing the elements within a confining frame and illustrating the application of fluid pressure within the tubes;

Fig. 3 is a perspective view of the finished section; and

Fig. 4 is an enlarged detail view illustrating the bond between the tubes and corrugated sheets.

Referring to the drawings, the invention is illustrated as employed in the manufacture of a heat exchanger section from a plurality of metal elements comprising tube or hollow members 1, corrugated members 2, and tube sheets 3. The tubes 1 have relatively thin flexible walls and are preferably oblong in cross sectional shape, so as to be readily expansible under the application of internal fluid pressure.

As the first step of the method, the tube members 1 are assembled in rows in two spaced tube sheets 3, so that the ends of the tubes project through correspondingly shaped holes in the tube sheets. The spacing between the major axes of the tubes is such that the corrugated members 2 are easily insertable between the rows of tubes.

In order to prepare the parts for bonding, a suitable solder or brazing material 4 is applied to the outer edges or apexes 5 of the various corrugations. Alternatively, the braze may be applied to the tubes, or to both the corrugated sheets and the tubes. The solder or braze may be of any suitable type, for example copper, silver, or a nickel-chromium alloy.

The assembled tubes 1 and tube sheets 3 are next positioned in a relatively strong confining structure such as the U-shaped fixture 6, Fig. 2, having brace portions 7 for increased rigidity. The chamber defined by the arms of the fixture 6 have predetermined dimensions corresponding to the desired size of the finished section. Preferably, the tube sheets are of approximately the same dimensions as the chamber so that the latter is substantially filled by the assembled elements.

The corrugated sheets 2 are then inserted in alternate stacked relation between the various rows of tubes, the positioning of the elements being such that the edges 5 of the corrugations are contiguous to the relatively flat surfaces of the tubes.

The ends of the tubes adjacent one of the tube sheets 3 are then sealed, for example by forcing the same against a heat resistant gasket sheet 8 positioned at the closed end of the confining member 6. In addition, a suitable header 9 is inserted in the open end of the confining member in order to provide for the admission of fluid pressure into the tubes from a suitable source, not shown.

Where the tubes and tube sheets have not been previously welded or soldered to each other, the inner portion of the header 9 is made of a plate 10 having a plurality of apertures 11 which are smaller than the ends of the tubes 1. The apertures 11 are positioned to register with the tube ends, and a correspondingly apertured heat resistant gasket sheet 12 is provided therebetween to make the connections between the header and tubes fluid tight.

As one means of forcing the tubes against the sealing gasket 8 and the header 9 against the tubes, a pair of wedges 13 are located over projections of the frame 6 and adapted to bear against the outer surface of the header 9. The desired fluid tight connections between the parts may thus be produced by merely tapping the wedges with a hammer.

With the described arrangement, a substantially fluid tight chamber is provided within each of the hollow members 1 while the elements are assembled in the confining fixture. Where it is desired to manufacture a section having parallel plates in place of the rows of tubes 1, suitable fluid tight chambers may be produced by sealing the edges of adjacent plates together during the interval when the plates are confined by the structure 6.

Fluid, for example compressed air, water, or steam, is then injected into the tubes by means of a metal pipe 14 leading to header 9. The pressure of the fluid is sufficient to cause expansion of the chambers within the tubes and consequent mutual pressing of all of the confined elements 1 and 2 against each other and outwardly against the rigid confining fixture 6.

The assembled parts are next heated to a soldering or brazing temperature, for example by placing the same in a furnace for a suitable period of time. The braze or solder 4 is thus melted, and in addition the tubes become set in their expanded condition so that the section conforms generally to the internal dimensions of the confining fixture 6.

The fluid pressure is preferably maintained during the entire heating interval. It is also desirable to maintain the pressure during the subsequent cooling step to insure a tight contact between the parts being bonded. The application of pressure during cooling is especially important where large sheets are employed in place of the tubes 1 since an undesirable sagging of the sheets might otherwise result upon discontinuance of the pressure.

After cooling, the bonded tubes 1 and sheets are disassembled from the confining structure through removal of the wedges 13 and header 9. If desired, the tube sheets 3 may be welded or soldered to the ends of the tubes either before, during, or after the bonding of the tubes 1 to the corrugated sheets.

For certain applications, a confining structure may be bonded to the tubes and corrugated sheets as a part of the described operations. In these cases the confining structure should either be relatively strong or be reinforced by suitable temporary brace members positioned externally thereof.

Because of its precise dimensions corresponding to the internal dimensions of the confining member, the resulting heat exchanger sections may be accurately assembled with correspondingly manufactured sections or with other structures. In the finished heat exchanger, fluid may be piped through the tubes 1 and air may be blown past the corrugated sheets 2, with both the tubes and sheets being formed from a metal such as stainless steel to maintain corrosion resistance at a minimum. The close bond effected as described between the tubes 1 and the corrugated sheets 2 or other members having the desired large surface area results in a maximum of heat transfer between the elements and decreases the possibility of failure under stress.

The use of the invention produces marked economies in heat exchanger manufacture in that the initial fit between the elements is relatively unimportant. Accordingly, mass-produced elements may be rapidly and easily assembled, with the desired accurate finished dimensions resulting from the invention instead of from the accuracy with which the component parts are constructed.

Various embodiments of the invention may be employed within the scope of the following claim.

I claim:

A method of manufacturing heat exchanger sections, which comprises positioning a plurality of metal tubes in spaced relation transversely of a pair of vertically extending tube sheets with the tubes lying one above the other in vertical spaced relation and projecting through the tube sheets and being secured thereto, said tubes being of oblong cross-sectional shape for ready expansion thereof, placing said tubes and tube sheets within a confining fixture provided with an upper and lower plate and open on the sides and having an end wall extending between the plates and over one end of the tubes, and said tube sheets engaging the upper and lower plates of the fixture, inserting corrugated metal sheets from one side of the fixture into the spaces between said tubes and the spaces between said tubes and plates with the corrugations extending transversely of the tubes to dispose the free ends of the sheets against a respective tube sheet, said corrugated sheets having brazing compound applied thereto, sealing the ends of said tubes and applying fluid pressure internally of the tubes to effect expansion thereof and consequent pressing of the confined elements against said fixture and tubes respectively, furnace heating said tubes and corrugated sheets to a brazing temperature, and cooling said tubes and corrugated sheets to the solidification temperature of the brazing compound, said fluid pressure within the tubes being maintained during said heating and cooling operations to insure a firm bond between the tubes and corrugated sheets and resulting in a finished section conforming exactly to the internal dimensions of the confining fixture.

References Cited in the file of this patent

UNITED STATES PATENTS

| Number | Name | Date |
| --- | --- | --- |
| 2,004,389 | Jones | June 11, 1935 |
| 2,252,210 | Seemiller | Aug. 12, 1941 |
| 2,294,137 | Spofford | Aug. 25, 1942 |
| 2,573,161 | Tadewald | Oct. 30, 1951 |